(12) United States Patent
Badding et al.

(10) Patent No.: US 7,674,735 B2
(45) Date of Patent: *Mar. 9, 2010

(54) GLASS-CERAMIC SEALS FOR USE IN SOLID OXIDE FUEL CELLS

(75) Inventors: Michael Edward Badding, Campbell, NY (US); Sasha Marjanovic, Painted Post, NY (US); Linda Ruth Pinckney, Corning, NY (US); Dell Joseph St Julien, Watkins Glen, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/273,022

(22) Filed: Nov. 18, 2008

(65) Prior Publication Data

US 2009/0075802 A1    Mar. 19, 2009

Related U.S. Application Data

(62) Division of application No. 11/546,237, filed on Oct. 11, 2006, now Pat. No. 7,470,640.

(51) Int. Cl.
C03C 10/04 (2006.01)
C03C 8/24 (2006.01)

(52) U.S. Cl. .................... 501/5; 501/8; 501/9; 501/15; 501/21; 501/26

(58) Field of Classification Search .................. 501/5, 501/8, 9, 15, 21, 26
See application file for complete search history.

(56) References Cited

U.S. PATENT DOCUMENTS

| | | | |
|---|---|---|---|
| 3,720,526 | A | 3/1973 | Duke et al. |
| 4,652,534 | A | 3/1987 | Kasuga |
| 5,298,332 | A | 3/1994 | Andrus et al. |
| 5,403,664 | A | 4/1995 | Kurahashi et al. |
| 6,430,966 | B1 | 8/2002 | Meinhardt et al. |
| 6,532,769 | B1 | 3/2003 | Meinhardt et al. |
| 7,189,470 | B2 | 3/2007 | Cortright et al. |
| 7,214,441 | B2 | 5/2007 | Cortright et al. |
| 7,214,635 | B2 | 5/2007 | Gonda et al. |
| 7,378,361 | B2 * | 5/2008 | Pinckney et al. ............ 501/5 |
| 7,410,921 | B2 * | 8/2008 | Pinckney et al. ............ 501/5 |
| 7,470,640 | B2 * | 12/2008 | Badding et al. ............ 501/5 |
| 2005/0277541 | A1 | 12/2005 | Yoshii et al. |

FOREIGN PATENT DOCUMENTS

| | | | |
|---|---|---|---|
| EP | 960866 | * | 12/1999 |
| JP | 61205637 | * | 9/1986 |
| JP | 5-31166 | | 2/1993 |
| JP | 6-60891 | | 3/1994 |
| JP | 06060891 | A | 3/1994 |
| JP | 2000086288 | * | 3/2000 |
| RU | 2089527 | C1 | 9/1997 |
| WO | WO2006/044593 | | 4/2006 |

OTHER PUBLICATIONS

"Glass-forming ability, sinterability and thermal properties in the systems RO-BaO-SiO$_2$ (R = Mg, Zn)", C. Lara, J. Non-Crystalline Solids, 348, 2004 149-155.

"Thick Film heaters made From Dielectric Tape Bonded Stainless Steel Substrates," S. J. Stein, et al Electro Science Laboratories Inc. 1995.

"On the crystal structure of pseudowollastonite (CaSiO$_3$)", H. Yang. American Mineralogist, V. 84, pp. 929-932.

"The Structure and Polytypes of α-CaSiO$_3$ (Pseudowollastonie)", T. Yamanaka, et al Acta Cryst. (1981), B37, 1010-1017.

"Structure and High-Pressure Polymorphismof Strontium Metasilicate," K. Machinda, Acta Cryst. (1982), B38, 386-389.

"Properties and Structure of Viterous Silica.I", R. Bruckner, J. of Non-Crystalline Solids 5 (1970) 123-175.

"Studies In the System CaO-Al$_2$O$_3$-SiO2-H$_2$O, II: The Stystem CaSiO$_3$-H$_2$O", Buckner, et al American Journal of Science, New Haven Connecticut, 1960, vol. 258 pp. 132-147.

"Crystallographic study of Ca$_2$BaSi$_3$O$_9$", Zeitschrift Fur Kristallographie, Frankfurt Am main (1961) Bd. 116, S. 263-265.

"Thermal Expansion", Handbood of Physical Constants , The Gological Society of American memoir 97, 1966 Section 6, 76-96.

"Glass/Metal and Glass-Ceramic/metal Seals", Engineered Materials Handbook, vol. 4, Tomsia, et al 493-501.

* cited by examiner

Primary Examiner—Karl E Group
(74) Attorney, Agent, or Firm—Walter M. Douglas

(57) ABSTRACT

The invention is directed to highly crystalline, frit-sintered glass-ceramic materials and seals made using them that are suitable for solid oxide fuel cell applications. The seals have a coefficient of thermal expansion in the range of 70-130×10$^{-7○}$ C., preferably 85-115×10$_{-7}$° C. The glass-ceramic materials have a crystalline component and a glass component, the crystalline component being >50% of the glass-ceramic and the glass component being <50%. In one preferred embodiment the crystalline component is >75%. Regarding the crystalline component only, >50% of the crystals in the crystalline component of the glass-ceramic has a structure selected from the structural groups represented by walstromite, cyclowollastonite, μ-(Ca,Sr)SiO$_3$, kalsilite, kaliophilite and wollastonite (the primary crystalline phase) and the remaining <50% of the crystalline component is at least one secondary crystalline phase. Generally, the glass-ceramics of the invention are useful as metal-to-metal, metal-to-ceramic and ceramic-to-ceramic sealing agents.

5 Claims, No Drawings

US 7,674,735 B2

GLASS-CERAMIC SEALS FOR USE IN SOLID OXIDE FUEL CELLS

PRIORITY

This application is a divisional application which claims the priority of U.S. patent application Ser. No. 11/546,237 titled "GLASS-CERAMIC SEALS FOR USE IN SOLID OXIDE FUEL CELLS" which was filed on filed Oct. 11, 2006 in the name of inventors Michael E. Badding, Linda R. Pinckney, Dell J. St. Julien and Sasha Marjanovic, now U.S. Pat. No. 7,470,640. Application Ser. No. 11/546,237 and the present application have common inventors and are commonly assigned to Corning Incorporated.

RELATED APPLICATION

This application is related to and claims the priority of co-pending U.S. patent application Ser. No. 11/402,761 titled "HIGH THERMAL EXPANSION CYCLOSILICATE GLASS-CERAMICS" filed Apr. 11, 2006. Co-pending application Ser. No. 11/402,761 and the present application have a common co-inventor, Linda R. Pinckney and are commonly assigned to Corning Incorporated.

FIELD OF THE INVENTION

The invention is directed to highly crystallized, frit-sintered glass-ceramics in which the primary crystal phases possess selected crystal structures as indicated herein, and in particular to seals for solid oxide fuel cells ("SOFC") that are made using the glass-ceramic materials described herein as sealing agents. In addition to SOFC use, the materials can be used as sealing agents for metal-to-metal, metal-to-ceramic and ceramic-to-ceramic seals.

BACKGROUND OF THE INVENTION

Glass-ceramics are polycrystalline materials formed by controlled crystallization of a precursor glass article. A glass-ceramic may be prepared by exposing a glass monolith to a thermal treatment for conversion to a crystalline state. This is referred to as a "bulk" or "monolith glass-ceramic forming process." U.S. Pat. No. 2,900,971 to Stookey describes the monolithic glass-ceramic forming technology. In general, raw materials that usually contain a nucleating agent are melted and simultaneously cooled to form a glass monolith of desired geometry. Subsequently, the glass monolith is exposed to a crystallizing thermal treatment that is referred to in the art as "ceramming." The appropriate thermal treatment typically includes a low temperature hold somewhere about the transformation range to induce nucleation, followed by one or more temperatures holds at temperatures above the softening point of the glass to promote crystal growth. In the monolith forming process nucleation transpires internally. The manufacture of glass-ceramics by bulk forming processes is compatible with the high-speed, automated manufacturing processes that are employed in the formation and manufacture of glass articles. In addition, one advantage of internal nucleation is that it can provide a wide range of polycrystalline microstructures. Consequently, by tailoring the temperature treatment regimes, one can alter the properties of the final glass-ceramic material.

Glass-ceramics may also be prepared by firing glass frits in what is referred to as powder processing methods. A glass is reduced to a powder state (frit), formed to a desired shape, and then fired and crystallized to a glass-ceramic state. In this process, the surfaces of the glass grains serve as nucleating sites for the crystal phases. The glass composition, particle size, and processing conditions are chosen such that the glass softens prior to crystallization and undergoes viscous sintering to maximum density just before the crystallization process is complete. Shape forming methods may include but are not limited to extrusion, slip casting, tape casting, spray drying, and isostatic pressing.

Glass-ceramic materials have properties that may make them suitable for many other uses. A recent application for glass-ceramic materials, and one growing in importance, is as a sealing agent for solid oxide fuel cells ("SOFC"). SOFCs are basically energy reactor systems in which chemical energy is converted to electrical energy. While they are similar to batteries, the differ in that they do not run down as do batteries because SOFCs are continuously supplied with fuel and are thus able to continuously supply electricity. They are thus limited only by the available supply of fuel, the same as any normal power plant. SOFCs operate at high temperatures in the range of 600-1000° C., though current research is seeking to lower this temperature range, and use ceramic materials for functional elements of the cell.

As a general description, SOFC are composed of an anode and a cathode separated by a solid impermeable electrolyte that conducts oxygen ions from the cathode to the anode where they react chemically with the fuel. The electrical charge that is induced by the passage of the ions through the electrolyte is collected and conducted from the cell to the use source. While each cell generates only a limited voltage, a number of cells can be constructed in series to increase the voltage to a useful power level. Small SOFCs units in 5-10 kW are available from various corporations and larger units from 25-125 kW are under development or in testing throughout the world.

When designing SOFC it is important that the fuel ($H_2$, $CH_4$, $C_2H_8$, CO, etc) and air ($O_2$) streams be kept separate and that thermal balance be maintained so that the operational temperature of the unit stays in an acceptable range. In order to ensure that both are accomplished, ceramic materials have been widely used in the design of SOFCs. However, since it is necessary to have a number of single cells in series in order to make a unit generating a usable amount of power, it is necessary that not only does the working components with a single cell be kept separate (no leakage), but also that there is no leakage from cell-to-cell in a series of cells. While various materials have been used as sealing agents, for example, epoxies and cements among others, improvements in this area are needed. The present invention discloses glass-ceramic materials that can be used as sealing materials.

The present invention is directed to seals for solid oxide fuel cells and novel compositions suitable for forming glass-ceramic sealing agents for such use.

SUMMARY OF THE INVENTION

In one aspect the invention is directed to boron-free, glass-ceramic seals for solid oxide fuel cells, said seals comprising a glass-ceramic having a <50% glass component and a >50% crystalline component. Regarding the crystalline component only, >50 wt. % of the crystals in the crystalline component of the glass-ceramic have a structure selected from the structural groups represented by walstromite, cyclowollastonite and µ-(Ca,Sr)$SiO_3$ (a cyclosilicate material), and mixtures of the foregoing (the primary crystalline phase). In addition to the above crystalline phases, one or more additional crystalline phases (<50%) can also be present in the ceramic part of the glass-ceramic, such phases constituting the remainder of the ceramic (crystalline) part of the glass-ceramic (the secondary crystalline phase). Examples of such additional crystalline phases include, without limitation, crystals having a structure represented by wollastonite, diopside, enstatite, and forsterite, or mixtures thereof. The CTE (25°-800° C.) of these glass-ceramics is in the range 70-130×10$^{-7}$/° C., preferably 85-115×10$^{-7}$/° C.

In one aspect the invention is directed to highly crystalline, boron-free glass-ceramic seals that can be used in solid oxide fuel cell, the seals having a crystalline component >75% and a glass component of <25% or less. In a preferred embodiment the crystalline component is >90% and the glass component is <10%. The CTE of these glass-ceramics is in the range 70-130×10$^{-7}$/° C., preferably 85-115×10$^{-7}$/° C.

Another aspect the invention is directed to boron-free glass-ceramic seals in which the glass-ceramic contains $SiO_2$, $Al_2O_3$, and at least one MO component, where MO is an alkaline earth oxide of Mg, Ca, Ba and Sr, and in which >50% of the crystals in the crystalline component of the glass-ceramic have a structure selected from the structural groups represented by walstromite, cyclowollastonite and μ-(Ca,Sr)$SiO_3$, and mixtures of the foregoing. In addition, the foregoing glass-ceramic seals can optionally contain minor amounts of other oxides such ZnO, $Nb_2O_5$, $Ta_2O_5$, $La_2O_3$, $Y_2O_3$, $Sb_2O_3$, and transition metal and rare earth oxides. Further, one or more additional crystalline phases can also be present in the ceramic part of the glass-ceramic, such phases constituting the remainder of the ceramic part of the glass-ceramic. Examples of such additional crystalline phases include, without limitation, crystals having a structure represented by wollastonite, diopside, enstatite, forsterite, and solid solution compositions or mixtures thereof. The CTE of these glass-ceramics is in the range 85-115×10$^{-7}$/° C.

In another aspect the invention is directed to a boron-free glass-ceramic seal having a composition comprising 30-50 wt. % $SiO_2$, 2-8 wt. % $Al_2O_3$, 10-40 wt. % CaO, and at least one of 0-40 wt. % SrO, 0-35 wt. % BaO, 0-10 wt. % MgO, wherein the sum the alkaline earth oxides ($\Sigma_{MO}$, where M is two or more of Mg, Ca, Ba and Sr) is in the range of 40-60 wt. % Optionally, Up to 8 wt. % ZnO and up to 10 wt. % $Nb_2O_5$, $Ta_2O_5$, $La_2O_3$, $Y_2O_3$, or $Sb_2O_3$ (or mixtures thereof) may also be included optionally in the composition. The CTE of these glass-ceramics is in the range 85-115×10$^{-7}$/° C. Expressed in range terms when an optional oxide is included in the composition, the amount of the oxide(s) selected is in the range of >0-8 wt. % for ZnO and >0-10% for $Nb_2O_5$, $Ta_2O_3$, $La_2O_3$, $Y_2O_3$, $Sb_2O_5$.

In another aspect the invention is directed to boron-free, zinc-free glass ceramic seals having a >50% crystalline component and a <50% glass component; and with regard to the crystalline component only, >50 wt. % of the crystalline component of the glass-ceramic is a crystalline phase selected from the group consisting of the potassium aluminosilicates kalsilite and kaliophilite, and wollastonite (the primary crystalline phase). In addition to the foregoing crystalline phases, one or more additional crystalline phases such as gehlenite, anorthite, kilchoanite, and corundum can also be present, such phases constituting the remainder of the crystalline component of the glass-ceramic (the secondary crystalline phase). The CTE of these glass-ceramics is in the range 70-130× 10$^{-7}$/° C., preferably 85-115×10$^{-7}$/° C. In one embodiment the boron-free, zinc-free glass-ceramic seals have a composition of 5-25 wt. % $Al_2O_3$, 25-45 wt. % CaO, 25-45 wt. % $SiO_2$, 1-10 wt. % $K_2O$ and 0-25 wt. % $GeO_2$. In another embodiment the boron-free, zinc-free glass-ceramic seals have a composition of 10-20 wt. % $Al_2O_3$, 30-40 wt. % CaO, 30-40 wt. % $SiO_2$, 2-8 wt. % $K_2O$ and 5-20 wt. % $GeO_2$.

In selected embodiments of (a) the boron-free, zinc-free, glass-ceramics, (b) the boron-free glass-ceramics, and (c) the boron-free glass-ceramics glass-ceramic containing $SiO_2$, $Al_2O_3$, and at least one MO component; the primary crystalline phase of the crystalline component is >75% and the secondary crystalline phase or phases, if present, is (are) <25% of the crystalline component. In yet another embodiment, the primary crystalline phase is >90% and the secondary crystalline phase or phases, if present, is (are)<10% of the crystalline component.

DETAILED DESCRIPTION OF THE INVENTION

As used herein, all compositions are given in bulk weight percent (wt. %), including specified crystalline component or phase and glass component percentages. For clarity, the term "glass-ceramic" as understood in the art means that the material has a glass phase or component and a crystalline phase or component that is dispersed uniformly throughout the glass. It is to be understood that the compositions of the invention can contain trace elements, herein meaning <0.4 wt. % and preferably <0.1 wt. %.

As to be understood herein and by way of example, reference to ">50% of the crystals of the crystalline component of the glass-ceramic having a structure selected from the group represented by walstromite, cyclowollastonite and μ-(Ca,Sr)$SiO_3$" is directed to the structure and not to the formula of the crystalline material represented by the "names" walstromite, cyclowollastonite and μ-(Ca,Sr)$SiO_3$. For example, the classical (end member) formulas for walstromite and cyclowollastonite are $Ca_2BaSi_3O_9$ and α-$CaSiO_3$, respectively. The seal materials described herein may contain additional elements in the structures in solid solution (see Examples 1-7 in Table 1), but >50% of the crystals in the crystalline phase will have the walstromite and cyclowollastonite structure and may include such additional elements. The remainder (that is, the <50%) of the crystals in the crystalline component will constitute a secondary phase if such phase is present. The classical (end member) formulas for various structures mentioned herein are: walstromite [$Ca_2BaSi_3O_9$], cyclowollastonite [α-$CaSiO_3$], wollastonite (β-$CaSiO_3$), diopside ($CaMgSi_2O_6$), akermanite ($Ca_2MgSi_2O_7$), hardystonite ($Ca_2MgSi_2O_7$), enstatite ($MgSiO_3$), forsterite ($Mg_2SiO_4$), gehlenite [$Ca_2Al_2SiO_7$], anorthite [$Ca_2Al_2Si_2O_8$], kilchoanite [$Ca_6(SiO_4)(Si_3O_{10})$], and corundum [$Al_2O_3$].

The invention is directed to boron-free glass-ceramic seals for solid oxide fuel cells, said seal comprising a glass-ceramic having a glass component and a crystalline component. In one embodiment, the crystalline component of the glass-ceramic is >50 wt. % and the glass component <50%. In another embodiment, the crystalline component of the glass-ceramic is >75 wt. % and the glass component is <25 wt. %. In another embodiment the crystalline component of the glass-ceramic is >90% and the glass component is <10%. In a further embodiment the invention is directed to boron-free, zinc-free glass-ceramic seals for solid oxide fuel cells, said seals comprising a glass-ceramic having a glass component and a crystalline component, the percentage each component, glass or ceramic, being as given above in this paragraph in the embodiments of the boron-free, glass-ceramic seals.

Regarding only the crystalline component of the glass-ceramic, >50 wt. % of the crystalline component, which hereafter may be referred to as the primary crystalline phase, has a structure selected from the group consisting of walstromite, cyclowollastonite and μ-(Ca,Sr)$SiO_3$), and solid solutions and mixtures thereof of the foregoing crystalline structures, or of the potassium aluminosilicates kalsilite and kaliophilite [KAlSiO$_4$], and wollastonite, and mixtures thereof. In addition to the above primary crystalline phases, one or more additional or secondary crystalline phases (the remaining <50% of the crystalline component) may also be present in the crystalline component of the glass-ceramic, such phases constituting the remainder of the crystalline component of the glass ceramic. Example of such secondary crystalline phases, without limitation, can include akermanite, hardystonite, wollastonite, diopside, enstatite, and forsterite. For example, if the primary crystalline phase in the crystalline component is 75% cyclowollastonite, the remainder, the secondary crystalline phase, can be 25% akermanite if magnesium is present or hardystonite is zinc is present. Those skilled in the art will understand that the exact nature and amount of the secondary phase will depend on the composition of the glass.

Seals are an integral part of solid oxide fuel cell (SOFC) planar design; they prevent the mixing of fuel and air, and also keep the fuel from leaking out of the stack or individual cells. The requirements of the seals (and thus the sealing agents or materials used to form them) are severe. For example, the seals must be capable of withstanding exposure to high temperatures of up to 1000° C., and exposure to both oxidizing and reducing environments. In addition, the seals must have a low vapor pressure, and must remain leak-tight and insulating over the lifetime of the stack which may exceed 50,000 hrs. Further, the seals must not degrade due to thermal cycling of the stack or due to changes in viscosity and chemical composition over time. These latter changes can result from volatility of certain species as well as from reaction with other fuel cell components such as electrodes and stainless steel interconnects. Finally, the seals must not themselves be a source of contamination that adversely affects the operation of other stack components, especially the cell electrodes.

The most commonly used sealing agents are cements, glasses, and glass-ceramics. Cement seals usually do not form leak-tight seals, and while glass seals can provide the required hermeticity, the upper temperatures at which they can be used are generally limited. The use of glass-ceramics as sealing agents enables one to avoid most, if not all, of these issues.

Powder-processed (frit-sintered) glass-ceramics are well known as metal-to-metal, metal-to-ceramic, and ceramic-to-ceramic sealing materials as well as high-performance coatings for metals and ceramics. In comparison with glasses, glass-ceramics offer higher use temperatures, superior mechanical properties and corrosion resistance, and a very wide range of thermal expansion coefficients (CTEs), which allow them to be used as expansion-matched seals for many different alloys. The ability to fill re-entrant angles and complex internal shapes by viscous flow of the molten glass during the crystallization that forms the glass-ceramic makes glass-ceramic materials particularly suited to applications where high strength of the system is important.

Nevertheless, even many glass-ceramic seals, particularly those containing a significant glassy component and/or readily-diffusing cations such as small alkali ions, can be unduly susceptible to reaction with the SOFC components and subsequent degradation of the device can occur over time. In one embodiment the present invention is directed to highly crystalline glass-ceramic seals, with less than 25% residual glass (crystalline component to glass component ratio of >75/<25), which are particularly well suited for the SOFC application. In another embodiment the present invention is directed to highly crystalline glass-ceramic seals, with less than 20% residual glass (crystalline component to glass component ratio of >80/<20), which are particularly well suited for the SOFC application. In a further embodiment the invention is directed to highly crystalline glass-ceramic seals with less than 10% residual glass (crystalline component to glass component ratio of >90/<10). The overall glass-ceramic seal has a thermal expansion closely matched to that of the fuel cell electrolyte and interconnect, and the glassy component that remains in the final microstructure is confined to interstices and some grain boundaries, and does not form a continuous path through the seal.

Advantages of highly crystalline glass-ceramic seal materials of the invention include:

They provide a route to low-stress hermetic seals through the advantageous sintering characteristics of a transient glass phase.

Near-zero porosity and discontinuous glass phase: Any residual glass occupies interstices and does not form a continuous path through the bulk of the material. This minimizes cation migration through the glass phase at high temperature and thereby represses any continuing reaction between the substrate and frit.

Minimal residual glass also results in no softening or permanent dimensional changes of the glass-ceramic seal during thermal cycling.

The seals are mechanically and thermally stable.

Thermal expansion of the crystallized seal matches those of SOFC components.

A requirement for highly crystalline glass-ceramic SOFC seals is that they have near-stoichiometric compositions such that they undergo near-complete crystallization and thus provide the high thermal expansions required for the SOFC application. Glass-ceramics which meet these criteria include those in which the crystals in the crystalline phase has a structure selected from the structures represented by the walstromite, cyclowollastonite and g-(Ca,Sr)SiO$_3$ structures, with secondary phases whose structures are based on structures including but not limited to the structures of wollastonite, diopside, akermanite, hardystonite, enstatite, and forsterite.

In another aspect of the invention, >50 wt. % of the crystalline component of the glass-ceramic is selected from the group consisting of potassium aluminosilicates kalsilite and kaliophilite, with secondary phases including but not limited to wollastonite, gehlenite, anorthite, kilchoanite and corundum. The CTE of these glass-ceramics is in the range 70–130×10$^{-7}$/° C., preferably 85–115×10$^{-7}$/° C.

Tables 1 and 2 below exemplify some of the compositions, in weight percent, that can be used as seals for SOFC applications. Seals made from the glass-ceramic materials exemplified in Table 1 contain SiO$_2$, Al$_2$O$_3$ and MO, where MO is an alkaline earth oxide of Mg, Ca, Ba and Sr. The primary (>50%) crystalline phase of the glass-ceramics exemplified in Table 1 is at least one of walstromite, cyclowollastonite and μ-(Ca,Sr)SiO$_3$), with secondary (<50%) phases of wollastonite, diopside, akermanite, enstatite, forsterite, and hardystonite, and solid solutions or mixtures thereof.

The composition of the glass-ceramic material useful as SOCF seals that are exemplified in Table 1 are glass-ceramic containing SiO$_2$, Al$_2$O$_3$, and MO, where MO is an alkaline earth oxide of Mg, Ca, Ba and Sr, and wherein the sum the alkaline earth oxides (ΣMO), where M is two or more of Mg, Ca, Ba and Sr, is in the range of 40-60 wt. %; and Al$_2$O$_3$ is in the range of 2-4 wt. %; and SiO$_2$ is in the range of 36-58 wt. %.

Boron-free, Zinc-free seals made from the glass-ceramic materials exemplified in Table 2 contain $SiO_2$, $Al_2O_3$ and CaO, and $R_2O$, where R is an alkali ion, preferably potassium (K). The crystalline component of the glass-ceramics exemplified in Table 2 has a primary crystalline phase whose structure is selected group consisting of kaliophilite and kalsilite structures, and can further have a secondary phases including, but not limited to, wollastonite, gehlenite, and corundum. The boron-free, zinc-free glass-ceramic seals of Table 2 have a compositional range of 5-25 wt. % $Al_2O_3$, 25-45 wt. % CaO, 25-45 wt. % $SiO_2$, 1-10 wt. % $K_2O$ and 0-25 wt. % $GeO_2$. In a preferred embodiment the compositional range of the boron-free, zinc-free glass-ceramic seals have a composition of 10-20 wt. % $Al_2O_3$, 30-40 wt. % CaO, 30-40 wt. % $SiO_2$, 2-8 wt. % $K_2O$ and 5-20 wt. % GeO2.

TABLE 2

| Sample No. | (11) | (12) | (13) |
|---|---|---|---|
| $Al_2O_3$ | 15.3 | 15.3 | 15.3 |
| CaO | 33.6 | 33.6 | 33.5 |
| $SiO_2$ | 36 | 35.9 | 35.9 |
| $K_2O$ | 4.9 | 4.2 | 3.5 |
| $GeO_2$ | 10.2 | 11 | 11.8 |

Glass compositions used for preparing the glass-ceramics according to the invention were prepared by melting the component materials in vessel, for example, a platinum crucible, at a temperature in the range of 1450-1650° C. for a time in the range of 2-5 hours. The starting materials may be the oxides,

TABLE 1

| Sample No. | (1) | (2) | (3) | (4) |
|---|---|---|---|---|
| $SiO_2$ | 39.2 | 37.4 | 45.5 | 44.3 |
| $Al_2O_3$ | 2.9 | 7.4 | 4.8 | 7.4 |
| CaO | 24.5 | 23.3 | 34.0 | 33.0 |
| SrO | | | 15.7 | 15.3 |
| BaO | 33.4 | 31.9 | | |
| MgO | | | | |
| ZnO | | | | |
| Base Cyclosilicate | $(Ca_{.67}Ba_{.33})$—$SiO_3$ | $(Ca_{.67}Ba_{.33})$—$SiO_3$ | $(Ca_{.80}Sr_{.20})$—$SiO_3$ | $(Ca_{.80}Sr_{.20})$—$SiO_3$ |
| XRD | Walst s.s. | Walst. s.s. | Cyclowoll s.s. | Cyclowoll s.s. |
| CTE 25-700 | 110 | 105 | 102 | 102 |

| Sample No. | (5) | (6) | (7) | (8) |
|---|---|---|---|---|
| $SiO_2$ | 34.8 | 47.8 | 42.3 | 41.0 |
| $Al_2O_3$ | 4.8 | 4.8 | 7.1 | 4.8 |
| CaO | 10.9 | 27.2 | 31.6 | 19.0 |
| SrO | 20.0 | 12.6 | 14.6 | 35.2 |
| BaO | 29.6 | | | |
| MgO | | 7.6 | | |
| ZnO | | | 4.4 | |
| Base Cyclosilicate | $(Ca_{.33}Sr_{.33}$—$Ba_{.33})SiO_3$ | $(Ca_{.64}Sr_{.16}$—$Mg_{.20})SiO_3$ | $(Ca_{.80}Sr_{.20})$—$SiO_3$ + ZnO | $(Ca_{.50}Sr_{.50})$—$SiO_3$ |
| XRD | Walst + μs.s. | Cyclowoll + diopside | Cyclowoll + hardyst. + m. woll | μs.s. + m. glass |
| CTE 25-700 | 106 | 95 | 87 | 100 |

| Sample No. | (9) | (10) |
|---|---|---|
| $SiO_2$ | 46.7 | 45.2 |
| $Al_2O_3$ | 4.7 | 4.5 |
| CaO | 26.6 | 25.8 |
| SrO | 12.3 | 11.9 |
| BaO | 0 | 0 |
| MgO | 7.4 | 7.2 |
| $Nb_2O_5$ | 2.3 | 0 |
| $Ta_2O_5$ | 0 | 5.4 |
| Base Cyclosilicate | $(Ca_{.64}Sr_{.16}$—$Mg_{.20})SiO_3$ | $(Ca_{.64}Sr_{.16}$—$Mg_{.20})SiO_3$ |
| XRD | Cyclowoll + diopside + m. åker | Cyclowoll + diopside + m. aker |
| CTE 25-700 | 104 | 103 |

Cyclowoll = Cyclo-wollastomite
Walst = Walstromite
Hardyston = Hardystonite
Aker = Akermanite
μs.s. = μ-$(Ca,Sr)SiO_3$
diop = diopside
m = minor
s.s.—solid solution
aker = åkermanite carbonates, nitrates, hydroxides and form a of the metals described herein that are known in the art to be useful in the preparation of glasses. In some embodiments, the melts were carried out at a temperature of 1600±50° C. for a time in the range of 2.5-4 hours. For each composition, a small, approximately 5 cm piece was formed from the molten glass composition and was annealed at a temperature of 750±40° C. These samples served as visual indicators of the overall glass stability. The remainder of the glass in each crucible was drigaged into water and milled to a mean particle size in the range of 10-20 μm (325 mesh). The resulting frit (frit=powdered glass) powder was formed into an article (pellets, bars, rods, etc,) using techniques known in the art. For example, for the testing purposes described herein the frit was dry-pressed into 12.76 cm diameter (0.5 inch) pellets and/or 10×0.6×0.6 cm CTE bars (4×0.25×0.25 inches), and then fired (sintered) at temperatures in the range of 850° C. to 1000° C. for a time in the range of 1-2 hours.

The glass-ceramic compositions of the invention have a coefficient of thermal expansion in the range of 70–130×$10^{-7}$/° C., preferably 85–115×$10^{-7}$/° C. For use as SOFC seals, in one preferred embodiment the highly crystalline glass-ceramic seals have a crystalline phase of >75 wt. % and a glass phase of <25 wt. %. In a further embodiment the crystalline phase is >90 wt. % and the glass phase is <10 wt. %.

Phase and structural information for the crystalline forms mentioned herein can be obtained from Phase Diagrams for Ceramists and other sources known to those skilled in the art; for example, XRD information can be found in JCPDS databases and used to identify crystalline forms present in the glass-ceramics.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A glass-ceramic seal composition, said composition being a boron-free glass-ceramic material consisting of:
   30-50 wt. % $SiO_2$, 2-8 wt. % $Al_2O_3$, 10-40 wt. % CaO, and at least one of 0-40 wt. % SrO, 0-35 wt. % BaO, 0-10 wt. % MgO; and
   optionally, at least one oxide selected from the group consisting of ZnO, $Nb_2O_5$, $Ta_2O_5$, $La_2O_3$, $Y_2O_3$, $Sb_2O_5$; and transition metal oxides, and
   wherein the $\Sigma_{MO}$, where M is one or more of Mg, Ca, Ba and Sr, is in the range of 40-60 wt. %, and
   when said optional oxide(s) is included in the composition, the amount of the oxide(s) selected is in the range of >0-8 wt. % for ZnO and transition metal oxides and >0-10% for $Nb_2O_5$, $Ta_2O_5$, $La_2O_3$, $Y_2O_3$, $Sb_2O_5$, and
   said composition is boron-free.

2. The glass ceramic seal composition according to claim 1, wherein the seal composition comprises >75% crystalline component and <25% glass component,
   the crystalline component having a >50% primary crystalline phase having a structure selected from the group of structures consisting of walstromite, cyclowollastonite and μ-$(Ca,Sr)SiO_3$, including solid solutions and mixtures of at least two of the foregoing crystalline phases, and the remainder of the crystalline component being <50% of one or more secondary phases.

3. The glass ceramic seal composition according to claim 2, crystalline phase is >90% and the glass 10% of less glass phase.

4. The glass-ceramic seal composition according to claim 2, wherein said seal has a CTE in the range of 85-115×$10^{-7}$/° C.

5. The glass-ceramic seal composition according to claim 3, wherein said seal has a CTE in the range of 85-115×$10^{-7}$/° C.

* * * * *